No. 642,988. Patented Feb. 6, 1900.
G. W. KORTRIGHT.
CLAMPING MEMBER.
(Application filed Nov. 15, 1898.)
(No Model.)
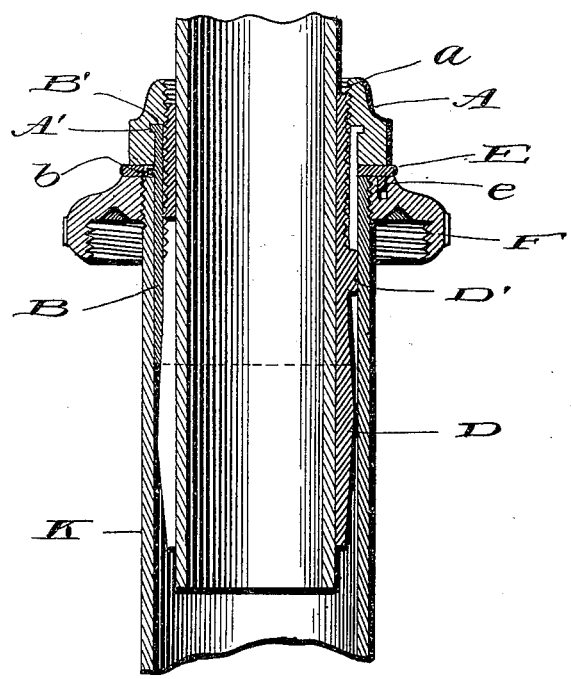
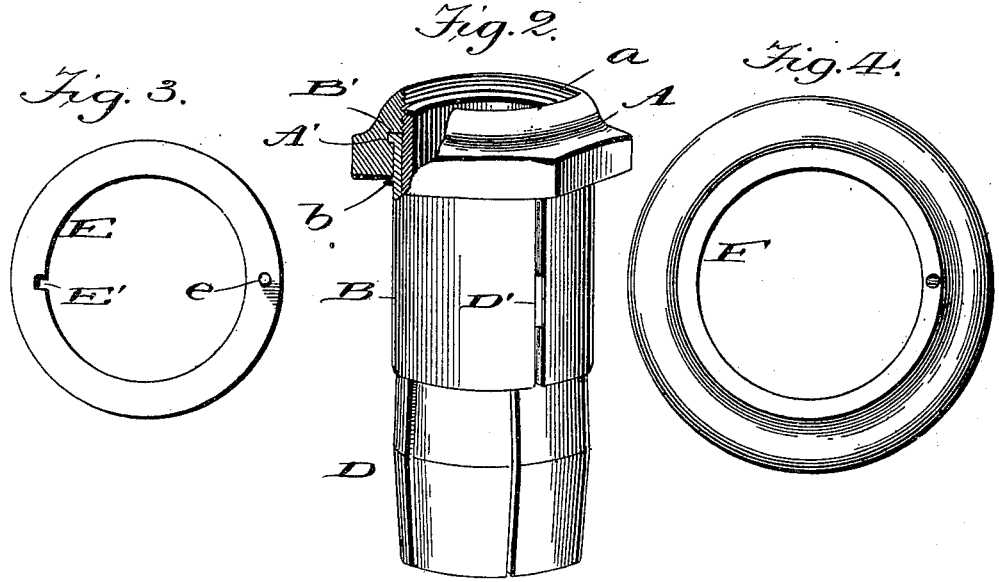
Witnesses
L. C. Hills
A. C. Hough
Inventor
Geo. W. Kortright
By Franklin H. Hough
Attorney
THE NORRIS PETERS CO., PHOTO-LITHO., WASHINGTON, D. C.

UNITED STATES PATENT OFFICE.

GEORGE W. KORTRIGHT, OF SIOUX CITY, IOWA.

CLAMPING MEMBER.

SPECIFICATION forming part of Letters Patent No. 642,988, dated February 6, 1900.

Application filed November 15, 1898. Serial No. 696,525. (No model.)

*To all whom it may concern:*

Be it known that I, GEORGE W. KORTRIGHT, a citizen of the United States, residing at Sioux City, in the county of Woodbury and State of Iowa, have invented certain new and useful Improvements in Clamping Members; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in clamping members, and especially to expanding telescopic clamps adapted for use in securely holding tubings in a fixed position, for use particularly in connection with saddle-posts and steering-heads of bicycles.

More specifically, the present invention resides in the provision of an expanding clamping-cylinder which is longitudinally slitted and provided with a flange at one end, which flange is fitted into a recessed or collared portion of a tightening-nut and having a swiveled connection therewith, an inner beveled clamping-cylinder threaded at its upper end for engagement with the nut carrying the flanged expanding cylinder and provided with a lug on its circumference, which lug engages between the slotted edges of the outer clamping-cylinder to prevent the rotation of the latter, and means for retaining in place the adjusting-cone as well as the various parts of the clamping device.

To these ends and to such others as the invention may pertain the same consists, further, in the novel construction, combination, and adaptation of parts, as will be hereinafter more fully described, and then specifically defined in the appended claim.

My invention is clearly illustrated in the accompanying drawings, which, with the letters of reference marked thereon, form a part of this application, and in which drawings similar letters of reference indicate like parts throughout the several views, in which—

Figure 1 is a vertical longitudinal sectional view through my clamping device shown as attached to telescoping tubes. Fig. 2 is a perspective view of the clamping device, parts being shown in section. Fig. 3 is a detail view of one of the locking-rings. Fig. 4 is a detail view of the threaded cone-bearing.

Reference now being had to the details of the drawings by letter, A designates the tightening-nut, which is interiorly threaded, as at $a$, and near the lower end of said nut is an annular recess A', which recess is cut in the nut below the threaded portion thereof. The outer expanding cylindrical shell B is provided with a flange B' at its upper end, as shown clearly in the sectional view of the drawings. This expanding band is tapered outward toward its lower end, and said flanged portion is adapted to be sprung into the recess A' in the nut, the insertion of this expanding shell in place being effected by contracting the shell and allowing it to spring back into the recess provided therefor.

The inner expanding member D is tapered toward its ends, as shown, and is externally threaded about its upper end, and its threads are adapted to engage with the threads of the tightening-nut. At any suitable location on the circumference of said expanding shoulder D, which is slitted longitudinally, as shown, is a lug D', which is adapted to extend between the ends of the outer clamping-shell to prevent rotation of said clamping-shell B. About the circumference of said shell B is a ring E, which ring has a recess E' in its inner periphery, which is adapted to engage over a lug $b$ on the circumference of shell B to prevent the said ring from turning on the expanding shell B. On the under surface of said ring is a lug $e$, which is designed to engage in a hole near the margin of the threaded opening in the bearing-plate F. This bearing-plate is adapted to be screwed to the outer tubing K, and when the various parts are in place and the nut is tightened it will be noted that the inner contracting shell as the tightening-nut is turned to the right will bind against the inner tube and the latter is caused to be drawn up and in so doing securely clamps the inner tube, and the outer circumference or the expanding shell B will bind against the inner wall of the outer tube, thus securely holding the parts in an adjusted relation.

Having thus described my invention, what I claim to be new, and desire to secure by Letters Patent, is—

In a clamping device for saddle-posts, &c., the combination of the threaded nut having an inverted-L-shaped recess in cross-section below its threaded portion, a split cylinder B having a right-angled flange designed to be sprung into the recess of the nut, a lug $b$ on said cylinder, the ring E having a recess in which said lug is seated, the inner split shell having a tapering circumference, its upper portion having threads which engage with said nut, the threaded bearing-ring with recess in its upper face, and lug integral with said ring engaging therein, as set forth.

In testimony whereof I affix my signature in presence of two witnesses.

GEORGE W. KORTRIGHT.

Witnesses:
 H. C. GARDINER,
 MAYE HALLAHAN.